US009879814B1

(12) United States Patent
Mackey

(10) Patent No.: US 9,879,814 B1
(45) Date of Patent: Jan. 30, 2018

(54) PIGGING SUPPORT SYSTEM

(71) Applicant: Richard Brent Mackey, Fort Worth, TX (US)

(72) Inventor: Richard Brent Mackey, Fort Worth, TX (US)

(*) Notice: Subject to any disclaimer, the term of this patent is extended or adjusted under 35 U.S.C. 154(b) by 235 days.

(21) Appl. No.: 14/801,035

(22) Filed: Jul. 16, 2015

Related U.S. Application Data

(60) Provisional application No. 62/025,082, filed on Jul. 16, 2014.

(51) Int. Cl.
*F16L 55/00* (2006.01)
*F16L 55/46* (2006.01)
*B08B 9/055* (2006.01)

(52) U.S. Cl.
CPC .............. *F16L 55/46* (2013.01); *B08B 9/055* (2013.01)

(58) Field of Classification Search
CPC ................................ B08B 9/055; F16L 55/46
USPC ......................................................... 138/108
See application file for complete search history.

(56) References Cited

U.S. PATENT DOCUMENTS

| | | | | |
|---|---|---|---|---|
| 4,494,780 A | * | 1/1985 | Burnett | F16L 41/12 285/148.26 |
| 4,966,397 A | * | 10/1990 | McKinnon | F16L 47/30 285/197 |
| 5,020,832 A | * | 6/1991 | Coblentz | F16L 47/30 285/133.11 |
| 5,360,241 A | * | 11/1994 | Gundy | F16L 41/12 285/197 |
| 6,705,801 B1 | * | 3/2004 | Kiest, Jr. | E03F 3/04 138/97 |
| 2012/0090414 A1 | * | 4/2012 | Kearns | F16L 55/46 73/865.8 |

* cited by examiner

*Primary Examiner* — Vishal Pancholi
(74) *Attorney, Agent, or Firm* — Richard G. Eldredge; Eldredge Law Firm

(57) ABSTRACT

A pig support system for a pipe includes a saddle having a flange integral with a ring extending therefrom, the ring forming an opening configured to provide passage to an inner channel formed by the pipe; a plurality of ribs disposed within the ring, the plurality of ribs having longitudinal lengths and configured to extend along the inner surface of the pipe; and, a lateral pipe configured to engage with the ring, the lateral pipe creating a second passage in fluid communication with the opening of the ring, the lateral pipe being configured to extend relatively perpendicular to the pipe.

1 Claim, 6 Drawing Sheets

PIGGING SUPPORT SYSTEM

BACKGROUND

1. Field of the Invention

The present invention relates generally to oil and gas pipelines, and more specifically, to a pig support system.

2. Description of Related Art

Pigging in the context of pipelines refers to the practice of using devices known as "pigs" to perform various maintenance operations on a pipeline. This is done without stopping the flow of the product in the pipeline. These operations include but are not limited to cleaning and inspecting the pipeline. This is accomplished by inserting the pig into a "pig launcher" or "launching station". The pig launching station consists of an oversized section in the pipeline which reduces to the normal diameter. The launching station is then closed and the pressure-driven flow of the product in the pipeline is used to push it down the pipe until it reaches the receiving trap, e.g. pig catcher or receiving station.

Pigs can get stuck in the pipeline when traveling past two large unsupported orifices. Pig support systems are known in the art and provide a means of supporting the pig as it passes over the orifice. In prior art, horizontal bars which run parallel to the pipeline axis are welded in the lateral inlet and outlets orifices. For example, FIG. 1 depicts a cross sectional view of a conventional pig support system. In the exemplary embodiment, system 101 includes one or more support bars 103 which are welded to the pipe inlet/outlet orifice 105.

A common disadvantage with the conventional pig support system 101 is the exposed pig support bar edges which can tear the elastomeric seals 107 on the pig. Another common disadvantage is the offset distance between the horizontal support bars and the inner diameter of the pipeline. The offset distance is present due to the conventional manufacturing process which creates a means for the pig to get stuck on the open orifice surface. A final disadvantage of conventional pig support systems is the labor intensive manufacturing process. Conventional pig support fabrication is a time consuming, multiple step process.

Although great strides have been made in the area of pig support systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
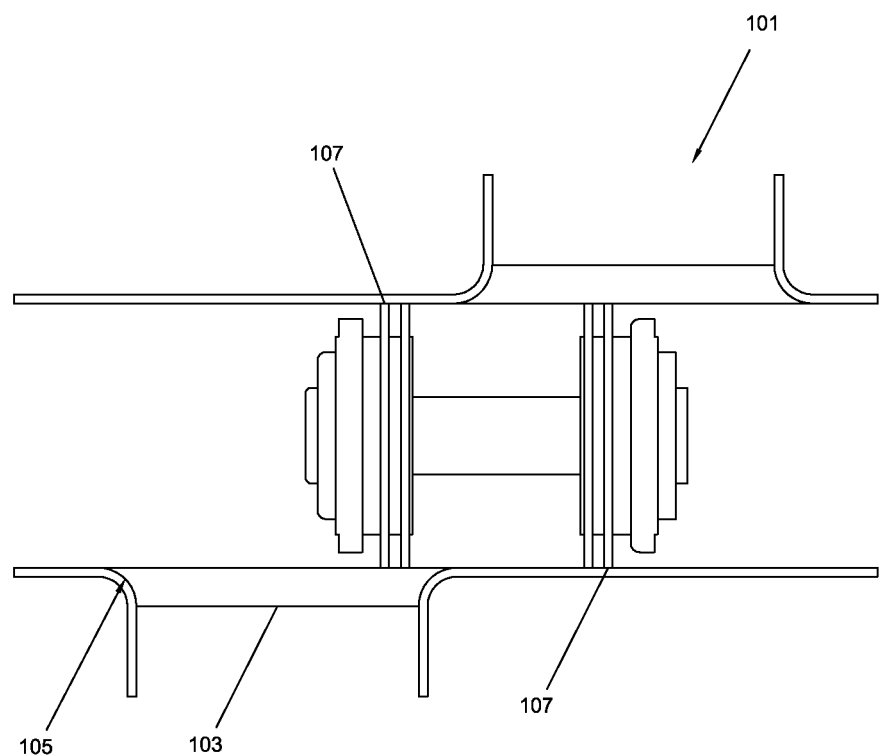
FIG. 1 is a front, cross-sectional view of conventional a pig support system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with pig support systems. Specifically, the system of the present application includes pre-manufactured pig support which is free of sharp edges which can cause damage to the pig. Additionally, the exemplary system is configured to eliminate drastic offset surfaces which can cause the pig to get stuck. The manufacturing of the "pig support ring" dramatically increases the ease of installation and greatly reduces the installation labor time. These and other unique features of the pig support system and methods of use are discussed below and illustrated in the accompanying drawings.

The system and method of use will be understood, both as to its structure and operation, from the accompanying drawings, taken in conjunction with the accompanying description. Several embodiments of the pig support system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
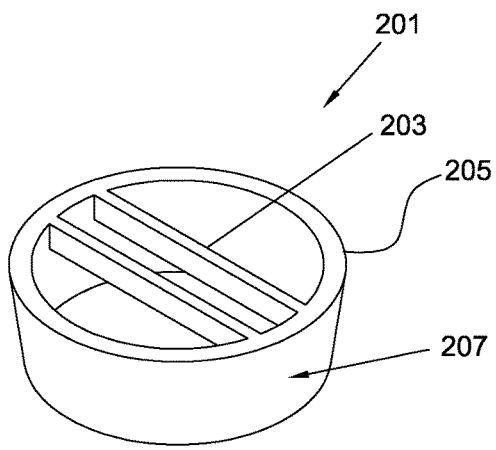
FIG. 2 is an oblique view of the preferred embodiment of the present application.

Referring now to the drawings wherein like reference characters identify corresponding or similar elements throughout the several views, FIG. 2 depicts an oblique view of a pig support system 201 in accordance with the preferred embodiment of the present application. It will be appreciated that system 201 overcomes at least one of the above-listed problems commonly associated with the conventional pig support systems.

In the contemplated embodiment, system 201 preferably includes a ring 205 and one or more pig support bars 203. Ring 205's diameter surface 207 is sized to fit into a specific pipeline inner diameter. Therefore, system 201 is configurable based on the inner diameter of the pipeline. The pig support bars 203 are attached to ring 205 by means of welding. The pig support bars 203 provide the support surface for the pig as it travels over the open orifice. One of the unique features believed characteristic of the present application is the added capability to pre-manufacture system 201 prior to the pipeline manufacturing Another unique feature is the manufacturing quality improvement that can be added when fabricating system 201 on a precision, standalone fixture.

As will be explained more fully below, the pig support bars 203 are flush with the upper surface of ring 205 which will allow the pig to travel smoothly over the support system. This feature overcomes common disadvantages with conventional pig support systems, e.g. protruding pig support bars tearing the elastomeric seals on the pig.

Figure 3:
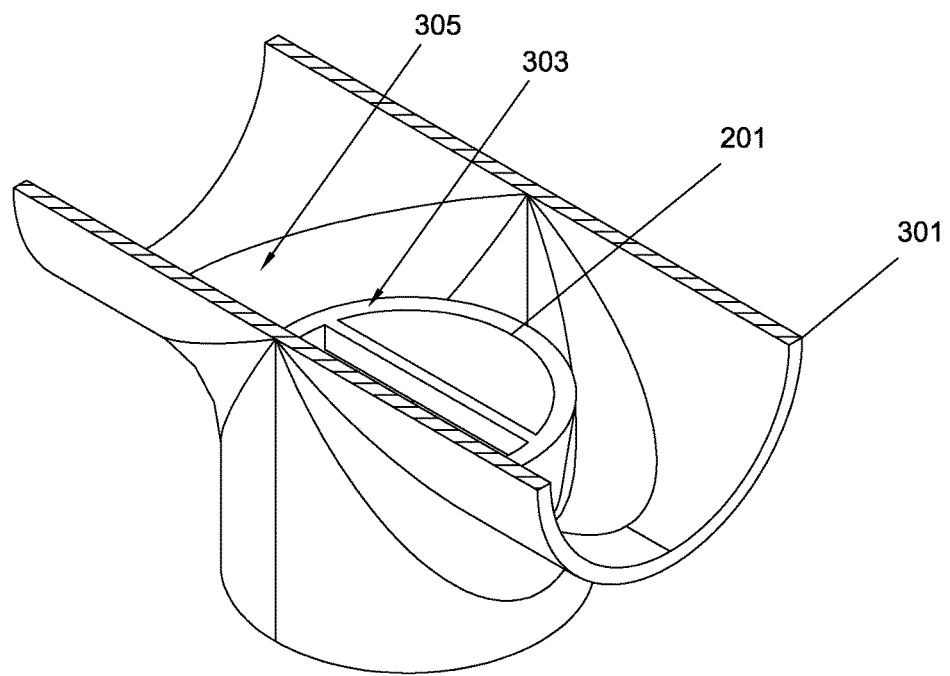
FIG. 3 is an oblique, cross sectional view of the preferred embodiment of the present application.

In FIG. 3, a sectional, oblique view is given which shows system 201 configured in a pipeline tee 301. The pig supporting surface 303 of system 201 is recessed slightly below the inner diameter surface 305 of pipeline tee 301 to prevent protruding edges which could cause the pig to get stuck or damaged. System 201 attaches to the pipeline tee by means of welding.

Figure 4:
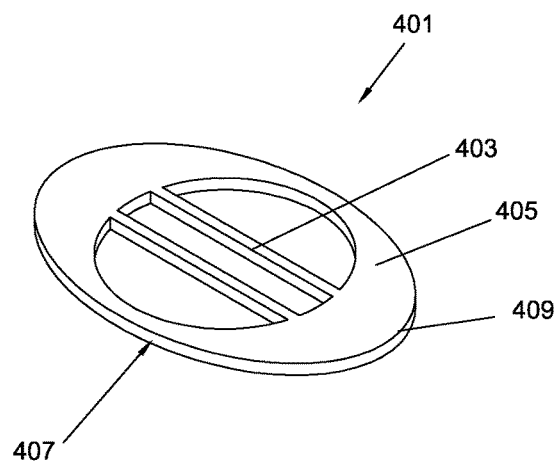
FIG. 4 is an oblique view of pig support system in accordance with an alternate embodiment of the present application.

FIG. 4 depicts an oblique view of a pig support system 401 in accordance with an alternate embodiment of the present application. System 401 is substantially similar in function to the System 201 discussed herein and hereby incorporates one or more of the features discussed herein, and vice-versa.

System 401 includes a ring 405 which is configurable in diameter 407 to fit in the pipeline inner diameter. Similarly, system 401 is scalable and configurable based on the pipeline size. In this embodiment, one or more pig support bars 403 are permanently attached to ring 401. The pig support bars 403 are flush with the upper surface of ring 405 which will allow the pig to travel smoothly over the support system.

One or more pig support flanges 409 are uniquely included in system 401. The pig support flanges 409 provide further support of the pig as it travels over the open orifice. The flanges are permanently attached to the ring 405 and are located flush with the upper surface of the ring. Similarly, this feature allows the pig to travel smoothly over the support system while preventing damage or sticking.

Figure 5:
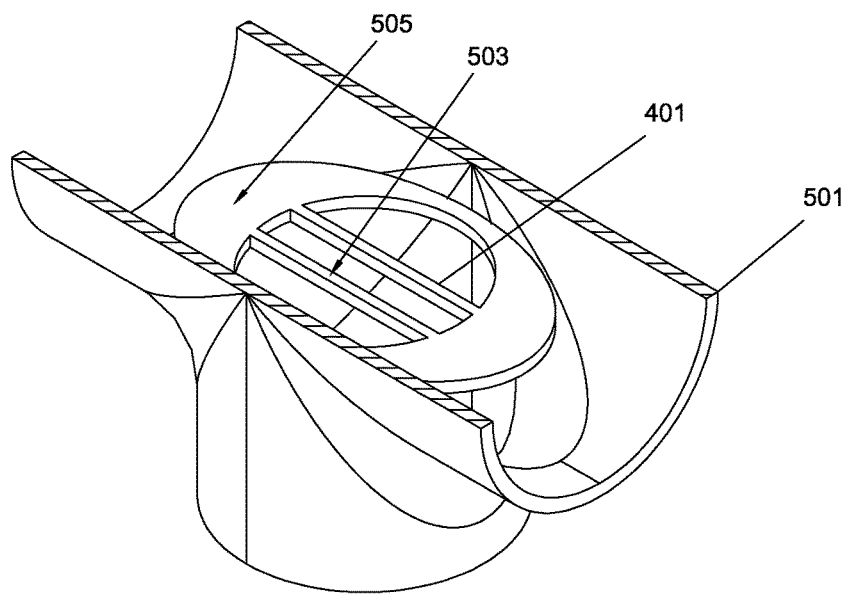
FIG. 5 is an oblique, section view of pig support system in accordance with an alternate embodiment of the present application.

In FIG. 5, a sectional, oblique view is given which shows system 401 configured in a pipeline tee 501. The pig supporting surface 503 of system 401 is recessed slightly below the inner diameter surface 505 of pipeline tee 501 to prevent protruding edges which could cause the pig to get stuck or damaged. System 201 attaches to the pipeline tee by means of welding. It is appreciated that the pig support surface 503 provides extended support due to the flange configuration as previously mentioned.

Figure 6C:
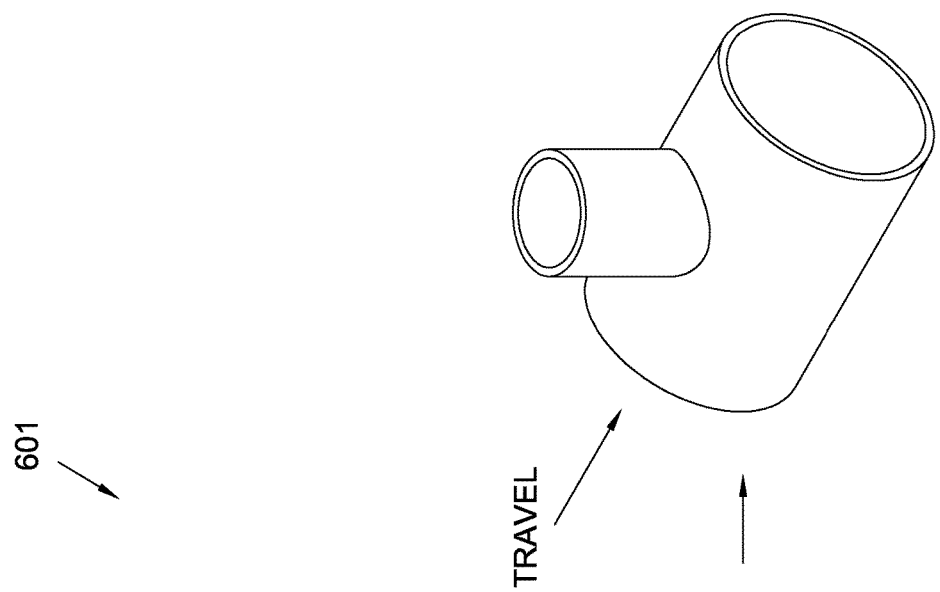
FIGS. 6A, 6B, & 6C are oblique views of the pig support system in accordance with an alternate embodiment of the present application.
Figure 6B:
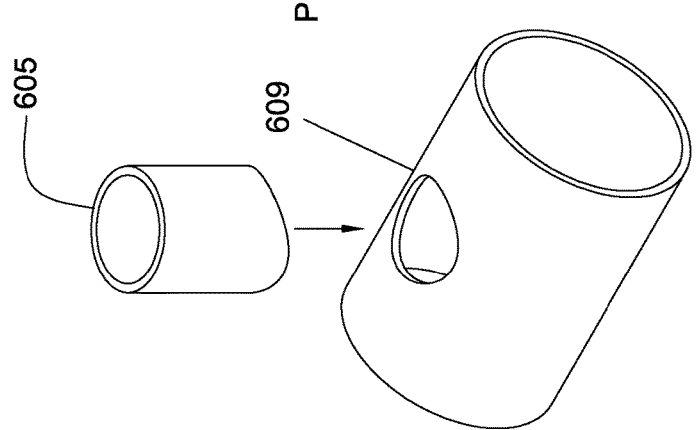
Figure 6A:
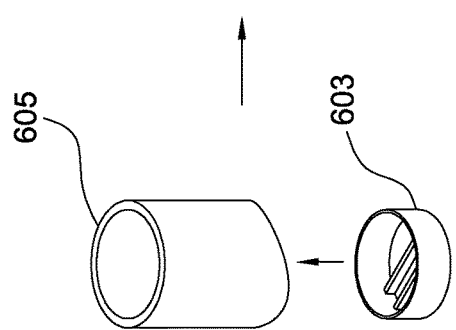

FIGS. 6A. 6B, and 6C depicts oblique views of an alternate embodiment, namely, lateral pipeline pig support system 601, of the present application.

FIG. 6A shows how pig support system 603 attaches to a lateral pipeline 605. Pig support system 803 is substantially similar in function to the System 201 & 401 discussed herein and hereby incorporates one or more of the features discussed herein, and vice-versa. One end of lateral pipeline 605 is contoured to fit on the outer diameter of the main pipeline 609. Pig support system 603 is permanently attached to the lateral pipeline 605 by means of welding prior as shown in FIG. 6A.

In FIG. 6B, the lateral pipeline 605 (with pig support system 603 previously attached) is attached to the main pipeline 609 by means of welding. Conventional pig support systems for lateral pipelines use uniquely fabricated pigging support bars. The fabrication process for conventional pig support systems for lateral pipelines includes layout, cutting, grinding, fitting, and welding which is labor intensive and error prone. This is viewed as a common disadvantage of conventional pig support systems for lateral pipelines.

In this alternate embodiment, FIG. 6C shows an oblique view of the final assembly of system 601 lateral pipeline pig support system. System 601 eliminates the labor intensive and error prone process of custom fabricating pigging support bars for lateral pipelines System 601 achieves this by using pre-manufactured pig support systems 603 which are configured to fit in the respective lateral pipe inner diameter. This is viewed as a sizeable advantage of this alternate embodiment of the present application.

Figure 7:
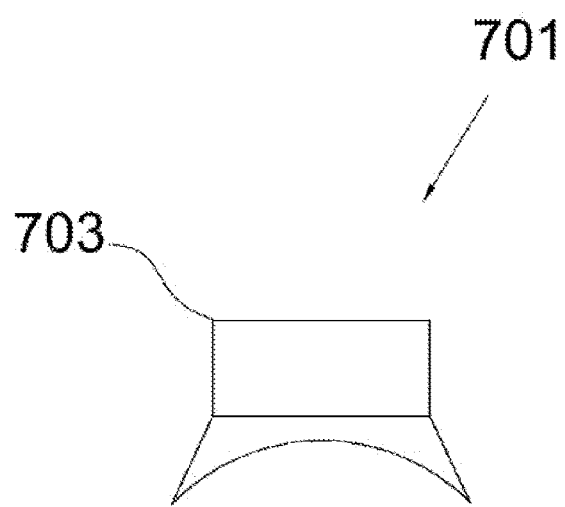
FIG. 7 is an oblique view of an alternate embodiment of the present application.

FIG. 7 depicts an oblique view of a pig support system 701 in accordance with an alternate embodiment of the present application. System 701 is substantially similar in function to the System 201 & 401 discussed herein and hereby incorporates one or more of the features discussed herein, and vice-versa.

System 701 includes a saddle ring 703 which is contoured to fit on an outer diameter of a pipeline. The "saddle" portion of saddle ring 703 acts as a stiffener when welded to the outer diameter of a primary pipeline. In this embodiment, one or more pig support bars are permanently attached to saddle ring 703. The pig support bars protrude through the saddle such that they are flush with the inner diameter of the primary pipeline when system 701 is installed. Similarly, system 701 is scalable and configurable based on the pipeline size.

Figure 8C:
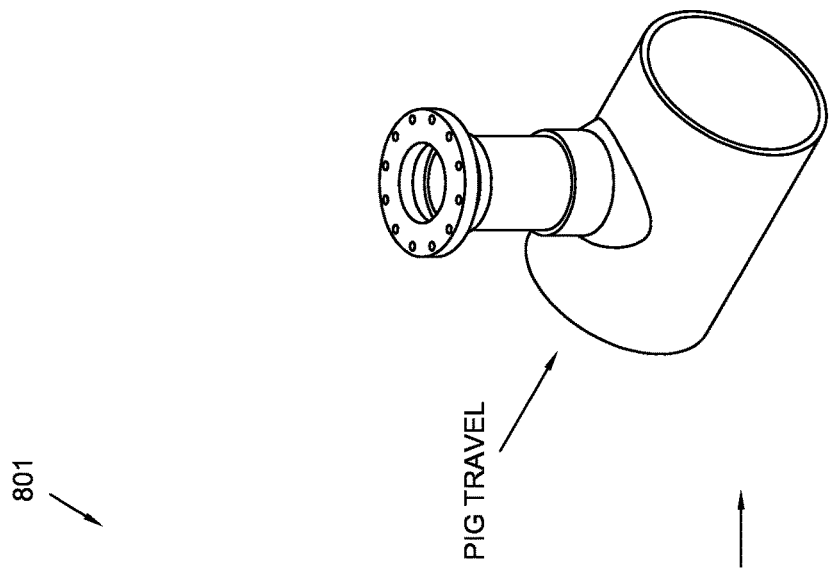
FIGS. 8A, 8B, & 8C are oblique views of the pig support system in accordance with an alternate embodiment of the present application.
Figure 8B:
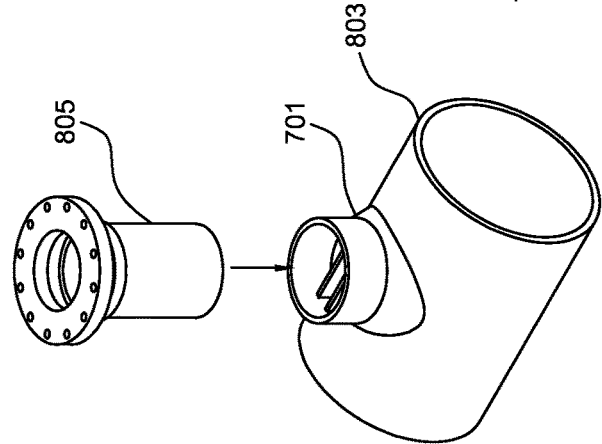
Figure 8A:
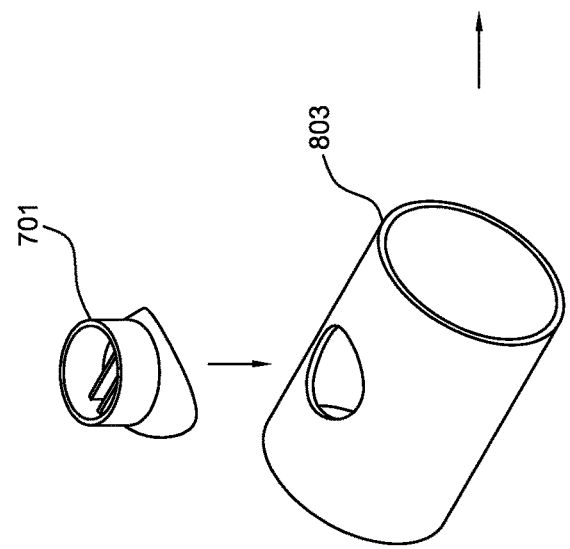

FIGS. 8A, 8B, and 8C depicts oblique views of an alternate embodiment, namely, lateral pipeline pig support system 801, of the present application.

FIG. 8A shows how pig support system 701 attaches to a primary pipeline 803. System 701 attaches permanently to the outer diameter of primary pipeline 803 by means of welding. Secondly, in FIG. 8B the lateral pipeline 805 is located in the pig support system 701. The outer diameter of the lateral pipeline 805 fits in the inner diameter of the pig support system 701 and is permanently attached by welding. The pig support bars located in system 701 are flush with the inner diameter of the primary pipeline 803 and provide a support surface for the pig when passing over the lateral orifice.

In this alternate embodiment, FIG. 8C depicts an oblique view of the final assembly of system 801 lateral pipeline pig support system. System 801 eliminates the labor intensive and error prone process of custom fabricating pigging support bars for lateral pipelines. System 801 achieves this by using pre-manufactured pig support systems 701 which are configured to fit the respective lateral pipe. This is viewed as a sizeable advantage of this alternate embodiment of the present application.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A pig support system for a pipe, comprising:
 a saddle having:
   a flange integral with a ring extending therefrom, the ring forming an opening configured to provide passage to an inner channel formed by the pipe;
  wherein the flange is contoured to match an outer surface of the pipe and provides support for the ring;
  a plurality of ribs disposed within the ring, the plurality of ribs having longitudinal lengths and configured to extend from a first side of the ring to a second side of the ring and across the opening; and
  a lateral pipe configured to engage with the ring, the lateral pipe creating a second passage in fluid communication with the opening of the ring, the lateral pipe being configured to extend relatively perpendicular to the pipe;
 wherein the ribs have a top surface flush with a top surface of the ring and a top surface of the flange, thereby providing a continuous smooth surface on which to support the pig; and
 wherein the ribs provide fluid passage to the second passage.

* * * * *